(12) United States Patent
Ramachandran et al.

(10) Patent No.: US 7,487,539 B2
(45) Date of Patent: Feb. 3, 2009

(54) CROSS DOMAIN AUTHENTICATION AND SECURITY SERVICES USING PROXIES FOR HTTP ACCESS

(75) Inventors: Viyyokaran Raman Ramachandran, Bangalore (IN); Dinkar Sitaram, Bangalore (IN); Kshitij Arun Doshi, Chandler, AZ (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 11/843,287

(22) Filed: Aug. 22, 2007

(65) Prior Publication Data
US 2007/0289006 A1 Dec. 13, 2007

Related U.S. Application Data

(63) Continuation of application No. 09/815,454, filed on Mar. 22, 2001, now Pat. No. 7,370,351.

(51) Int. Cl.
*G06F 17/30* (2006.01)
(52) U.S. Cl. .................... 726/10; 726/5; 726/3
(58) Field of Classification Search .............. 726/10, 726/5, 3
See application file for complete search history.

(56) References Cited

OTHER PUBLICATIONS

A description logic for PKI trust domain modeling Haibo Yu; Chunzhao Jin; Haiyan Che; Information Technology and Applications, 2005. ICITA 2005. Third International Conference on vol. 2, Jul. 4-7, 2005 pp. 524-528 vol. 2.*

An Authentication Model for Multi-Type Domains in Active Networks Rong Rong; Li Zhong-wen; Jiang Ye-feng; Anti-counterfeiting, Security, Identification, 2007 IEEE International Workshop on Apr. 16-18, 2007 pp. 350-355.*

Enabling Pervasiveness by Seamless Inter-domain Handover: Performance Study of PANA Pre-authentication Chamuczynski, P.; Alfandi, O.; Brosenne, H.; Werner, C.; Hogrefe, D.; Pervasive Computing and Communications, 2008. PerCom 2008. Sixth Annual IEEE International Conference on Mar. 17-21, 2008 pp. 372-376.*

Lambrou, M.A.; Anagnostou, M.E.; Protonotarios, E.N.; "Multi-domain Federation Polocies in Open Distributed Service Architectures"; Engineering and Technology Management, 1998. Pioneering New Technologies: Management Issues and Challenges in the Third Millennium. IEMC '98 Proceedings. International Conference on Oct. 11-13, 1998; pp. 71-76.

(Continued)

*Primary Examiner*—David Y Jung
(74) *Attorney, Agent, or Firm*—Marger Johnson & McCollom PC

(57) ABSTRACT

Two identity spaces form a federation by agreeing to use a secret key to facilitate secure access of resources between them. When one identity space receives a request for a resource from a user in the other identity space, the first identity space checks to see if the resource is protected. If the resource is protected, the first identity space requests that a mediator in the second identity space authenticate the external user. The mediator verifies the external user's authenticity. Once the external user is authenticated, the mediator securely informs the first identity space, using the secret key, that the external user is authenticated to access the resource. The identity space then grants the user access to the resource if the user is allowed access as per the access control policy of the identity space.

15 Claims, 11 Drawing Sheets

OTHER PUBLICATIONS

Cotroneo, D.; di Flora, C.; Ficco, M.; Russo, S.; "A Strategy for Application-Transparent Integration of Nomadic Computing Domains"; Software Technologies for Future Embedded and Ubiquitous Systems; 2005. Third IEEE Workshop on May 16-17, 2005; pp. 50-57.

Bhatti, R.; Bertino, E; Ghafoor, A.; "X-Federate: a policy engineering framework for federated access management"; Software Engineering, IEEE Transaction on vol. 32, Issue 5, May 2006; pp. 330-346.

http://www.microsoft.com/windowsxp/home/using/productdoc/en/default.asp?url=/windowsxp/home/using/productdoc/en/AuthIntro.asp; As printed on Sep. 8, 2004.

http://www.comptechdoc.org/os/windows/win2k/win2kauthentication.html; As accessed on Sep. 4, 2004.

http://en.wikipedia.org/wiki/Single_sign-on; As accessed on Jan. 7, 2007.

http://en.wikipedia.org/wiki/Federated_identity; As accessed on Jan. 7, 2007.

Kormann, D.P.; Rubin, A.D.; "Risks of the Passport Single Signon Protocol"; Computer Networks, Elsevier Scient Press, vol. 33, pp. 51-58, Jun. 2000.

Pfitzmann, B; Waidner, M.; "Federated Identity-Management Protocols"; 11th International Workshop on Security Protocols (2003), LNCS 3364, Springer-Verlag, Berlin 2005, pp. 153-174.

Kaminsky, M.; "User Authentication and Remote Execution Across Administrative Domains"; Ph.D. Thesis, MIT, Sep. 2004.

\* cited by examiner

Access Control List

| | | | |
|---|---|---|---|
| BluePark.com 415 | Jack 420 | http://www.GreenPark.com/data.html 425 | GET 430 |
| GreenPark.com 445 | Strategic Cust. 450 | http://www.GreenPark.com/data.html 455 | GET 460 |
| ... | ... | ... | ... |

405
410
440

Identity Mapping

| | |
|---|---|
| Jack@BluePark.com 475 | Strategic Cust. 480 |
| ... | ... |

CROSS DOMAIN AUTHENTICATION AND SECURITY SERVICES USING PROXIES FOR HTTP ACCESS

RELATED APPLICATION DATA

This patent application is a continuation of commonly assigned U.S. patent application Ser. No. 09/815,454, filed Mar. 22, 2001, now allowed, which is hereby incorporated by reference.

FIELD OF THE INVENTION

This invention pertains to accessing web pages, web services, and other web resources across institutional boundaries, and more particularly where security controls are enforced on accesses to web pages, web services, and other web resources across institutional boundaries.

BACKGROUND OF THE INVENTION

Currently, business information is shared over the internet by creating identities in the corporate network for the customers and business partners. This is done either tunneling the data through the internet using a virtual private network (VPN) or over the hypertext transport protocol (HTTP) using transport security protocols like Secure Sockets Layer (SSL). But these approaches have security and operational drawbacks.

Creating identities for external parties and facilitating access through a VPN gives the external parties a foothold in your corporate intranet. They may be tempted to explore the vulnerabilities of your network for subverting it.

Creating and managing identities for each and every external entity adds administrative overhead. Every time an external party's access rights change, the internal identity must be updated to reflect the change.

The capabilities of organizational HTTP proxies as front ends to organizational information are not fully exploited.

Accordingly, a need remains for a way to federate two or more organizational identity spaces (domains) through their HTTP proxies for the purpose of cross domain authentication and authorization for secure and granular HTTP access without the need to create representational identities in one domain for the principals in another domain, to address these and other problems associated with the prior art.

SUMMARY OF THE INVENTION

The invention is a method and apparatus for performing cross domain authentication of an external user to control resource access across institutional boundaries. The identity space receives a request for a resource from an external user. The external user is challenged to authenticate himself within his local identity space. Once the external user is authenticated, the identity space is informed of the authentication, and access to the resource is granted securely.

The foregoing and other features, objects, and advantages of the invention will become more readily apparent from the following detailed description, which proceeds with reference to the accompanying drawings.

BRIEF DESCRIPTION OF THE DRAWINGS

FIG. 4 shows an access control list and an identity mapping for purpose of authorizing use of the resources in the other identity space of FIG. 1.

DETAILED DESCRIPTION OF THE PREFERRED EMBODIMENT

Figure 1:
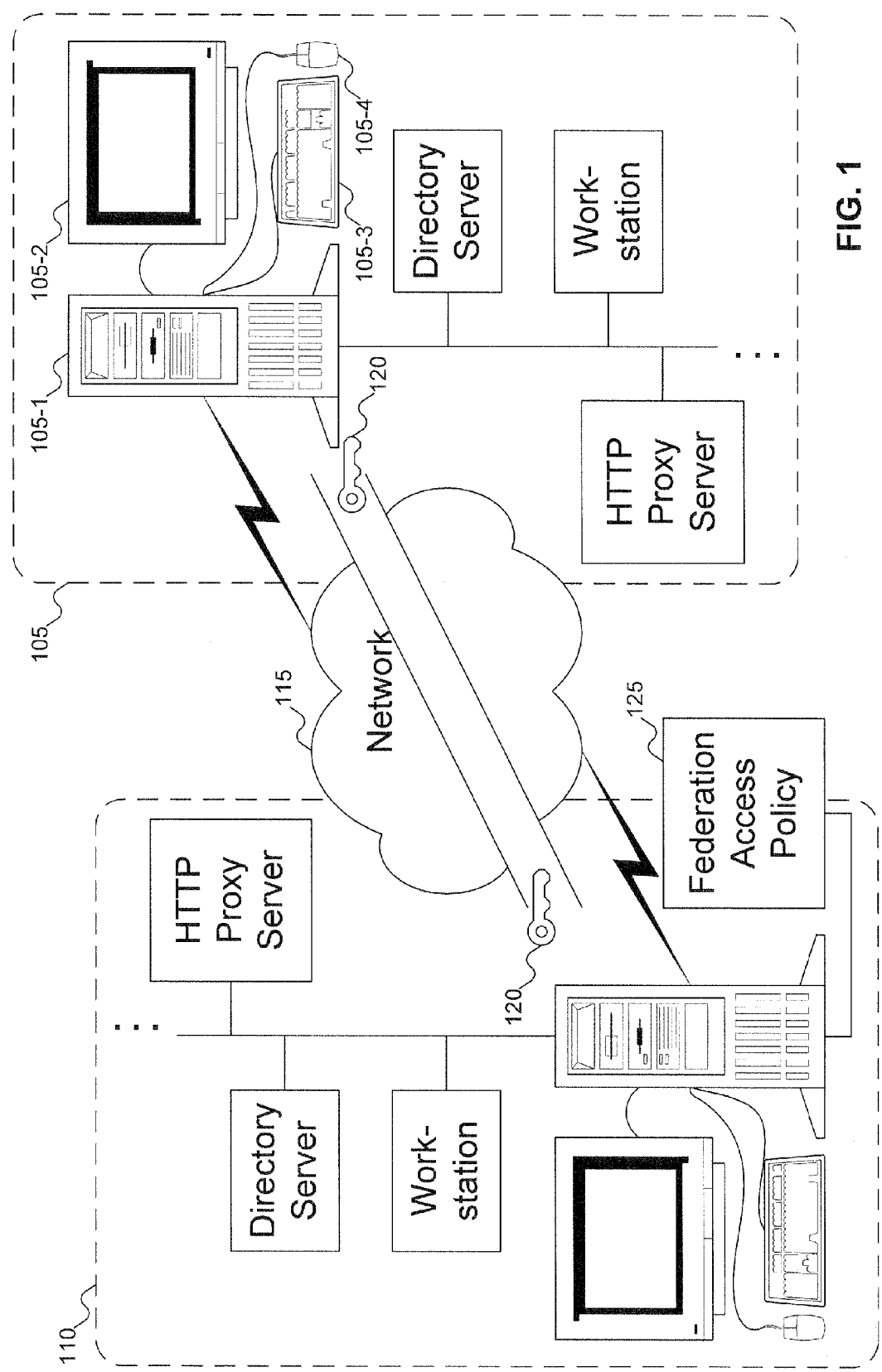
FIG. 1 shows two identity spaces connected via a network, so that users in one identity space can be authenticated and authorized to use resources in the other identity space.

What is Cross Domain Authentication using HTTP Proxies

The preferred embodiment of the invention leverages the fact that hypertext transport protocol (HTTP) proxy servers are used to mediate HTTP traffic (both incoming and outgoing) to an organization. At its core, a proxy federation is an agreement between two organizations to relate their identity spaces (also referred to as domains) to facilitate the following objectives:

1. Cross domain (inter-identity space) authentication for HTTP access. An identity in one domain can be authenticated to another domain in the federation without actually creating an identity in the latter.

2. Cross domain authorization and access control. An organization (identity space) can define and enforce a locally administered federation access policy for facilitating HTTP access across identity spaces. In other words, the policy can granularly specify the access rights for any identity in the local or remote domains in the federation.

3. Confidentiality and integrity protection for the HTTP data flow between identity spaces.

The federation is formed by the organizations agreeing to a shared secret (i.e., a cryptographic symmetric secret key). Depending on the parties' intent, the federation can last for a fixed amount of time, the federation can last until one party or the other wishes to end the federation, or the federation can last forever.

This means that a web server in an organization (identity space) named GreenPark can authenticate an identity in an organization (identity space) named BluePark and control access to its (GreenPark) pages through the locally administered GreenPark federation access policy. Note that this authentication is done without creating an identity in GreenPark for a BluePark user. This is called cross domain authentication and it is made possible by the HTTP proxies in the organizations GreenPark and BluePark, based on their initial one-time agreement realized using cryptographic means. The cryptographic means (shared secret) is explained below.

Once cross domain authentication is made possible, it can be the basis for cross domain authorization in the form of the federation access policy of an organization which specifies rights for any identity in the federated identity space. Compare this with the traditional access control list, which can only recognize identities defined in the local identity space. The access control enforcement is done by the proxies, making authentication transparent to the web server. The integrity and confidentiality services for cross domain HTTP access is made possible by negotiating a session key at the time of cross domain authentication, again provided by the proxies, transparent to the end users and origin servers.

How it Works

A federation at its minimum consists of the following components:

1. Two intranet or internet identity spaces (an identity space is a collection of identities authenticatable within that identity space) representing the respective organizations.
2. The web servers in each identity space, serving corporate information.
3. Two organizational proxies, one belonging to each identity space.
4. An agreement between the identity spaces, realized using a shared secret configured to the proxies.
5. Federation access policies in each identity space.
6. Security module on each proxy to mediate and enforce secure, federated HTTP access.

The origin web servers serve the corporate information to the internal users and also to the users in external identity spaces belonging to the federation. The federation access policy specifies both internal and external authorizations and is administered locally by the system administrator of the identity space.

The security module is the key component in the federation and may either run on the proxy or on a separate machine. It provides the functionality of authenticating each and every incoming and outgoing HTTP access requests (cross domain authentication). It provides additional security services of integrity and confidentiality for the information flow over the internet in the federation. It protects the shared long-term secret in the federation. And it enforces the federation access policy for access requests originating from the local as well as external identity spaces in the federation.

Each identity space in a federation maintains its own federation access policy. This means that the administrator of the local identity space decides who in the federation can access the information served by the local identity space. This has to be so because the owner of the information should be the authority for authorization. The security module consults the federation access policy to enforce access control for internal and external access requests. The Access Policy may be specified as access control list (ACL) entries where each entry lists a local resource (for example a universal resource locator (URL) in the web server), a subject principal name to whom the access right is granted, and the type of access (the types of access include HTTP methods GET, POST, and PUT for URL resources and read, write, delete, and execute for file resources). The subject principal name appearing in the ACLs belongs to the federated identity space. Also the ACL entry specifies whether the resource is to be encrypted for confidentiality and integrity protected when served to the subject upon a request from him.

FIG. 1 shows two identity spaces configured to operate as a federation according to the preferred embodiment of the invention. Identity space 105 and identity space 110 are typically local computer networks administered by respective owning organization. The computers in the identity space are typically servers such as web servers, proxy servers, directory servers and workstations for end users. Servers such as directory servers typically hold the user identity information in the identity space. The identity information is used by the servers to authenticate the end users whenever they access some resource or service using their work stations.

Servers and workstations are computing machines that include a computer 105-1, a monitor 105-2, a keyboard 105-3, and a mouse 105-4. Identity spaces 105 and 110 typically include servers and workstations, but a person skilled in the art will recognize that identity spaces 105 and 110 can also include, for example, internet appliances, lacking monitor 105-2, keyboard 105-3, or mouse 105-4. Optional equipment not shown in FIG. 1 can include a printer and other input/output devices. Also not shown in FIG. 1 are the conventional internal components of servers and workstations in identity spaces 105 and 110: e.g., a central processing unit, memory, file system, etc.

Identity spaces 105 and 110 are connected to network 115 (typically the internet), allowing identity spaces 105 and 110 to share resources over the network. Identity spaces 105 and 110 each have a copy of shared long-term secret 120, which, as discussed above, is used for authentication of a remote user.

Identity space 110 also includes federation access policy 125, which includes a security module. Federation access policy 125, as described above, is used to specify which external users, once authenticated, are authorized to access which local resources. Although FIG. 1 only shows identity space 110 with a federation access policy, a person skilled in the art will recognize that each identity space in the federation can have its own federation access policy and security module.

Protocol Details of HTTP Access in a Federation

Consider two identity spaces GreenPark and BluePark that have already formed a federation in order to securely share their resources over a network. This means they have already agreed upon a shared long-term secret key and configured it to their respective HTTP proxies.

The forward HTTP proxy and reverse HTTP proxy in an identity space, though shown logically separate may be hosted in the same box. When the administrator of the GreenPark identity space decides to give a user Jack in the BluePark identity space access to a protected resource from the GreenPark identity space, an entry is added to the GreenPark federation access policy, authorizing Jack to access the resource. This is the necessary and sufficient requirement for Jack to get access to the resource. In order to access a resource (such as a URL) in the GreenPark identity space, Jack uses his web browser to submit an HTTP access request to the BluePark forward proxy. The BluePark forward proxy first authenticates Jack and then forwards the request to the GreenPark reverse proxy along with an authenticator credential needed for authenticating the access request at the BluePark reverse proxy. The GreenPark reverse proxy authenticates the request to check that it is a properly mediated request by the BluePark forward proxy and also checks against any possible replay. Finally, the GreenPark reverse proxy validates the request against the federation access policy in place for access rights enforcement. If these conditions are satisfied, the GreenPark reverse proxy forwards the request to the origin server for GreenPark. The origin server computes the response and sends the response to the GreenPark reverse proxy. The GreenPark reverse proxy then encrypts the response for confidentiality and/or integrity, depending upon whether Jack has requested encryption and/or integrity protection in his access request and also on whether the access control entry in the GreenPark federation access policy requires it. The transformed response is then sent back to the BluePark forward proxy. The forward proxy performs the reverse transformation on the response by decrypting and verifying integrity, and forwards the response to Jack's browser. Note that the entire sequence of operations in the access request/response is transparent to Jack's browser and to the origin server in GreenPark, except that Jack is authenticated by the BluePark forward proxy by explicitly collecting his credentials. But this is done only once by the BluePark forward proxy. Thereafter, it can maintain a session with Jack's browser (for example, by using a local cookie), and all subsequent requests from Jack are authenticated transparently by the proxy.

Note that except the initial authentication step, all transactions are transparent to the user and origin server and are carried out by the proxies. As far as the user is concerned, he requests access to a URL in a remote server in the federation, he submits his local authentication credentials (e.g., password) to his local forward proxy and, as a result he gets the requested resource from the remote server, provided he had been given rights earlier by the remote identity space federation access policy. This access protocol is implemented by the proxies using a combination of HTTP protocol elements such as HTTP redirect, cookies, forms and HTTP QueryString. The steps in performing the cross domain authentication and access control are now explained in greater detail.

Step 1

The user Jack in identity space BluePark submits an HTTP GET request for the URL http://www.GreenPark.com/data.html in the remote identity space GreenPark. Jack's browser is configured to access internet through the BluePark forward proxy. The forward proxy forwards the request to the remote server. At this point the forward proxy treats the request in a conventional manner without distinguishing it as a request for a resource in a federated identity space. This reduces the burden on proxy in terms of implementation.

Step 2

The remote identity space GreenPark receives the request through its reverse proxy. The reverse proxy security module consults the federation access policy to see if the requested resource is a protected resource. If so, the request needs to be authenticated. To perform the authentication, the GreenPark reverse proxy redirects the request to a mediator URL http://mediator, identifying the remote identity space prefix, the requested resource, and a random challenge nonce. The remote identity space prefix, requested resource, and random challenge nonce are embedded in the HTTP redirect URL as an HTTP query string. A person skilled in the art will recognize that an HTTP query string is any URL encoded with arbitrary data present in the URL as part of the HTTP request, and that a web server or a proxy server receiving such a request can extract and process the data embedded in the request URL.

The HTTP redirect is basically a request to the BluePark forward proxy to act as a mediator to authenticate the user's request. The remote identity space prefix is provided to help the BluePark forward proxy retrieve the correct long-term shared secret key corresponding to the remote identity space GreenPark. Multiple long-term shared keys can exist because an identity space can have independent federations with many other remote identity spaces, and hence the forward HTTP proxy stores the long-term shared secret keys for each such federation. This key is used to construct the authenticator and to encrypt the session key. The random nonce is used to authenticate the request and to prevent replay.

The GreenPark reverse proxy sends this response irrespective of the identity space from which the request originated. The GreenPark reverse proxy security module at this point makes an entry in its internal table to keep track of this request until it is fulfilled. This entry stores all parameters of the request available at this point such as the requested URL, time of request and the random nonce.

Step 3

Jack's browser transparently sends an HTTP GET request to the redirect URL http://mediator, along with all the parameters mentioned above encoded as a query string and a local authentication cookie. The BluePark forward proxy recognizes this special redirect URL as an authentication request by a remote reverse proxy and stores all the parameters for use in subsequent steps.

Step 4

The BluePark forward proxy authenticates Jack if it had not done this already or if the earlier authentication has expired based on the local authentication cookie's lifetime mentioned in step 3. The authentication involves getting the user's local identity space authentication credentials and verifying them. This depends upon the local intranet infrastructure and operating system. Regardless of how the authentication is performed, the authentication is just a local authentication within the originating identity space. This is part of mediating the access by the BluePark forward proxy.

The BluePark forward proxy can skip this step if the user is already authenticated based on the local authentication cookie's lifetime. The purpose of the local authentication cookie is to avoid the repeated authentication of a user making a series of HTTP requests for federated access. The local authentication cookie is preferably a keyed checksum of the user's name, IP address, and validity time in order to prevent the user from tampering it, but a person skilled in the art will recognize that the local cookie can be set in other ways. The local authentication cookie is set on the browser by the BluePark forward proxy after successful authentication of the local user when he requests the GreenPark resource for the first time.

Step 5

After successful authentication of the requesting user, the BluePark forward proxy constructs and sends an HTTP redirect as the response to Jack's browser to redirect it to the originally requested URL. The proxy also sets another local session cookie, distinct from the local authentication cookie, on the browser to prevent replay by another local user. The redirect message contains all the parameters necessary to cross authenticate Jack to the remote identity space reverse proxy, embedded as an HTTP query string in the redirect URL. The redirect message includes the original URL, the local identity space prefix, the user's name, the security options being negotiated, the random challenge nonce, a cryptographic keyed hash of the above parameters concatenated together (encoded using the long-term secret key shared between the identity spaces), and a session key encrypted using the long-term secret key. The redirect URL is the originally requested URL, which is now being re-requested with the necessary authentication credentials for consumption by the GreenPark reverse proxy. The identity space prefix parameter is used by the remote reverse proxy to retrieve the long-term shared secret key with the requesting identity space. This is used to authenticate and verify the request. The requesting user's name in federation name format is used by the remote reverse proxy to retrieve the relevant access control entries from its federation access policy for the purpose of access rights enforcement. The security options specify whether integrity and confidentiality (encryption) protection is requested for the response. The random nonce is used to authenticate the request by reverse proxy and also to prevent replay of earlier redirect requests. It is the same nonce as sent earlier by the GreenPark reverse proxy. The cryptographic keyed hash is a keyed hash of the all the above parameters concatenated, where the hashing is done using the shared secret with the remote identity space. The encrypted session key is to be used by remote reverse proxy for encrypting and integrity protection of the HTTP response. The use of random nonce and the session key together ensure mutual authentication of client and server. An alternative session key can be computed from the session key and the random challenge nonce by both proxies in the protocol, so that both parties have a say in the session key.

Step 6

The browser transparently sends a GET request for the redirect URL. The browser also sends the local session cookie to the BluePark forward proxy. On seeing the local cookie, the BluePark forward proxy concludes that the request is already authenticated and forwards it to the GreenPark reverse proxy after stripping off the local cookie. The GreenPark reverse proxy verifies the request by independently computing the keyed hash of the request and comparing the result with the attached keyed hash in the request. The GreenPark reverse proxy also verifies that the nonce is the same as the one the GreenPark reverse proxy sent earlier, in order to detect and prevent replay. The GreenPark reverse proxy verifies that the time between receiving the request in steps 1 and 6 is within the maximum limit set for processing a request. The Green-Park reverse proxy also recovers the encrypted session key. Finally the GreenPark reverse proxy consults the federation access policy to see if the user is granted rights for the requested URL. If everything is ok, it forwards the request to the origin server, after stripping off the authentication credentials.

Step 7

The origin server at GreenPark receives the HTTP request from the GreenPark reverse proxy and sends the HTTP response to the GreenPark reverse proxy. The GreenPark reverse proxy encrypts and/or protects the integrity of the body of the HTTP response using the session key. Finally, the GreenPark reverse proxy forwards the response to the BluePark forward proxy. The forward proxy decrypts and checks the integrity of the response using the session key and forwards the plain response to the user Jack's browser.

Note that only two HTTP request/response pairs are taking place between the forward and reverse proxies for the entire access. This is the case for any other HTTP authentication mechanism like basic and digest. Hence there is no additional traffic in this protocol.

Two local cookies are used in the protocol between the requesting browser and the forward proxy. One cookie is used to avoid repeating the local authentication step, which makes the protocol more efficient. The other cookie is used to prevent another local user from replaying a captured redirect, in order to gain unauthorized access.

Figure 2:
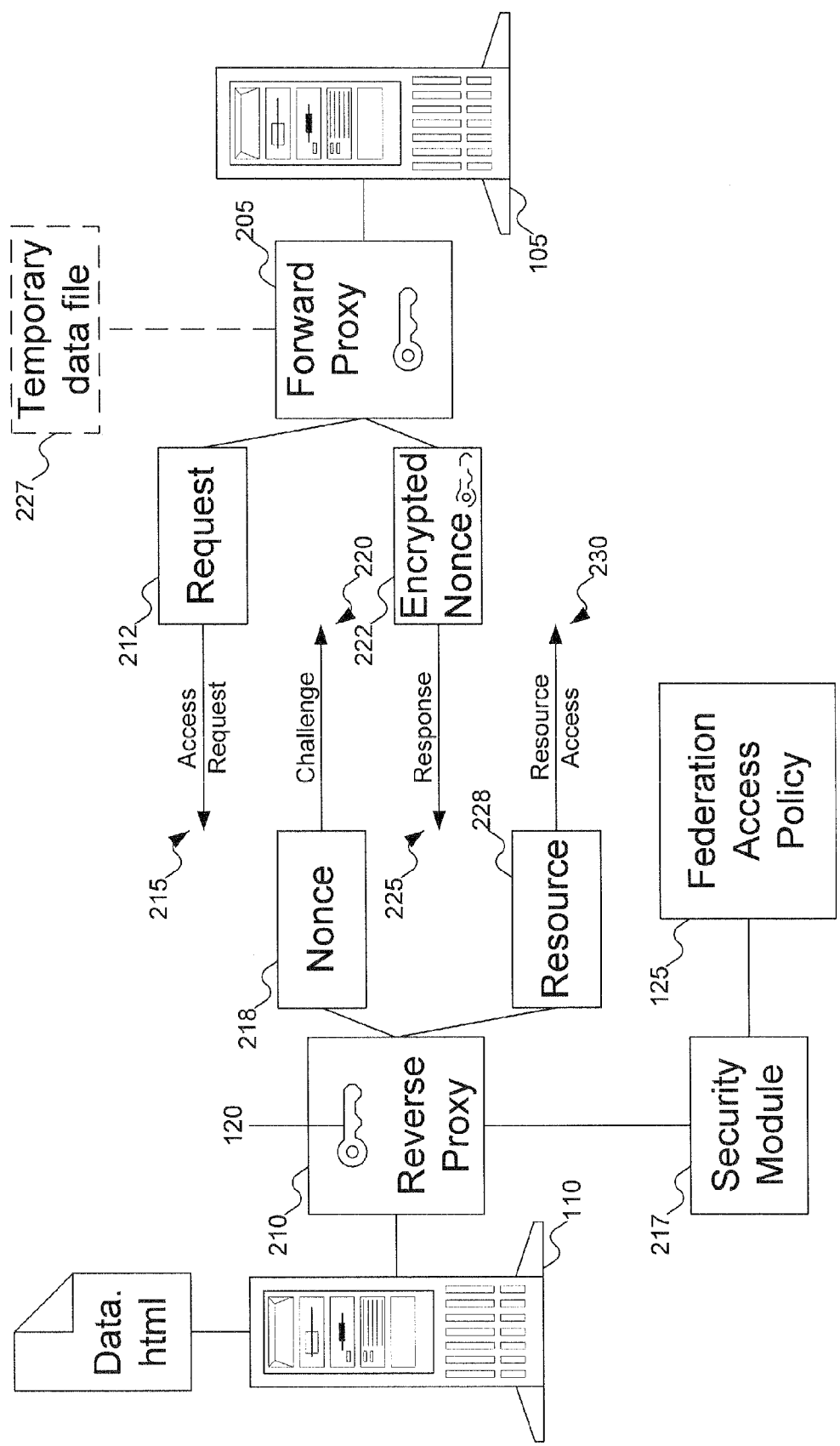
FIG. 2 shows graphically how a user in one of the identity spaces of FIG. 1 can be authenticated and authorized to use resources in the other identity space of FIG. 1.

FIG. 2 shows identity spaces 105 and 110 communicating, allowing a user local to identity space 105 to access a resource of identity space 110. Because the user is local to identity space 105 and external to identity space 110, identity space 105 is shown with only forward proxy 205, and identity space 110 is shown with only reverse proxy 210. But a person skilled in the art will recognize that in the preferred embodiment, each identity space in the federation includes both a forward proxy and a reverse proxy. When the user (local to identity space 105) requests access to the resource of identity space 110, forward proxy 205 receives the request (typically from a browser) and routinely forwards access request 212 to identity space 110, as shown by arrow 215. Reverse proxy 210 receives request 212 and consults security module 217 to determine if the resource is restricted or freely available. Security module 217 checks federation access policy 125 to determine whether the resource is protected. If the resource is freely available, reverse proxy 210 allows access to the resource, and the user views the resource as normal.

But if the resource is protected, reverse proxy 210 requests that the user authenticate himself. Reverse proxy 210 sends random challenge nonce 218 back to forward proxy 205, as shown by arrow 220. As discussed above, random challenge nonce 218 is used to establish that the user was able to properly authenticate himself to forward proxy 205. Forward proxy 205 requests that the user properly authenticate himself, typically by providing a valid username and password combination. Assuming that the user is able to properly authenticate himself, forward proxy 205 encrypts random challenge nonce 218 provided by reverse proxy 210 using shared long-term secret 120, producing encrypted nonce 222. Forward proxy 205 then returns encrypted nonce 222 to reverse proxy 210, as shown by arrow 225. Forward proxy 205 also stores temporary data file 227, such as the cookie described above, to remember that the user has been properly authenticated. Reverse proxy 210 independently encrypts random challenge nonce 218. Reverse proxy 210 can then compare encrypted nonce 222 with the result of its (reverse proxy 210) encryption of random challenge nonce 218. If the two match, it establishes that forward proxy 205 properly encrypted random challenge nonce 218, which means that the user was able to properly authenticate himself. Reverse proxy 210 requests that security module 217 check whether the user is authorized to access the resource, using federation access policy 125. If the user is both authenticated and authorized, then reverse proxy 210 permits access to resource 228 by the user from identity space 105, as shown by arrow 230.

For simplicity, FIG. 2 does not show the redirect operations performed by forward proxy 205 when it acts as the mediator. A person skilled in the art will recognize how FIG. 2 can be modified to include this element.

Figure 3A:
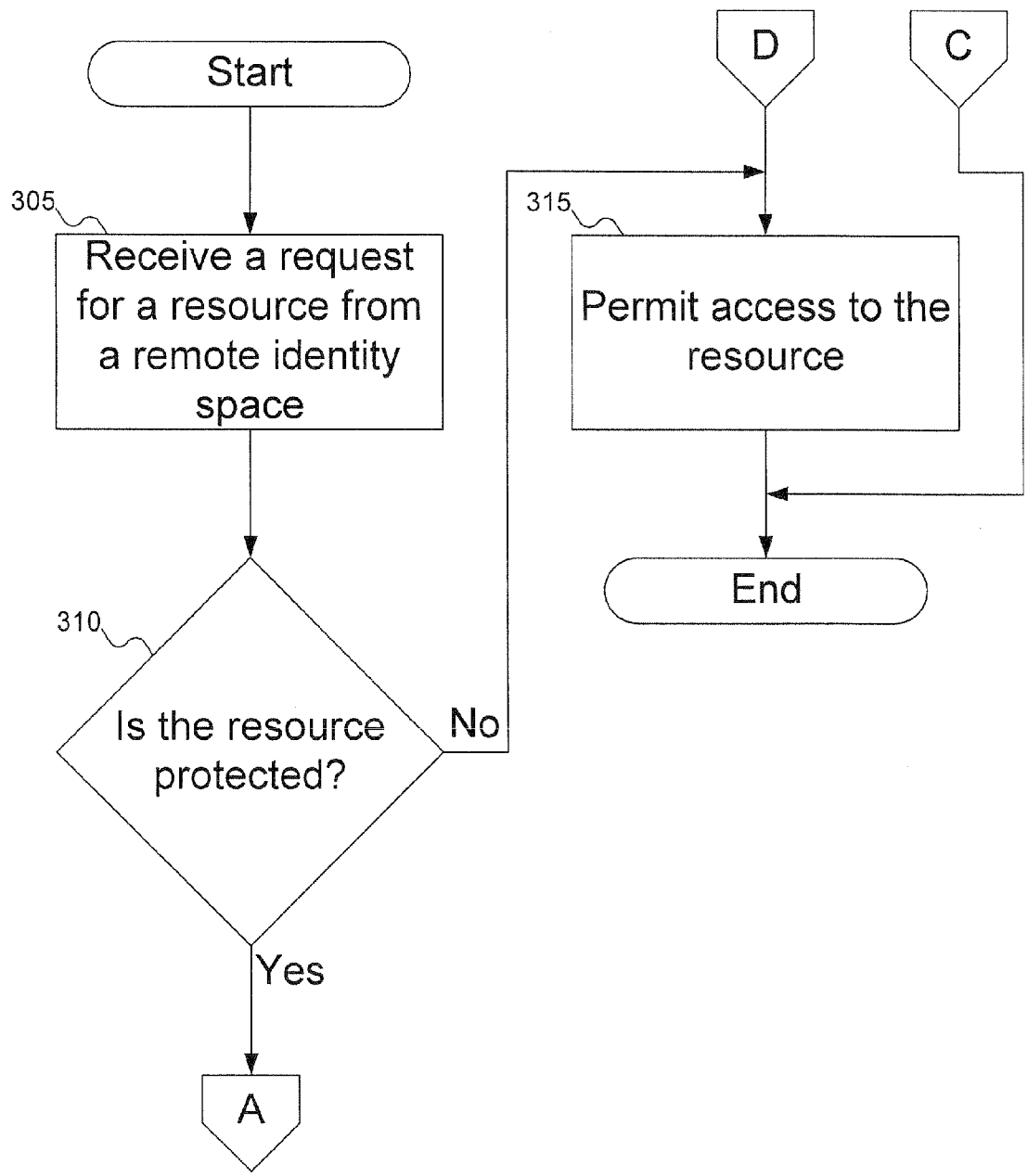
FIGS. 3A-3C show a flowchart of a method according to the preferred embodiment of the invention to access a resource in the remote domain of FIG. 2.
Figure 3B:
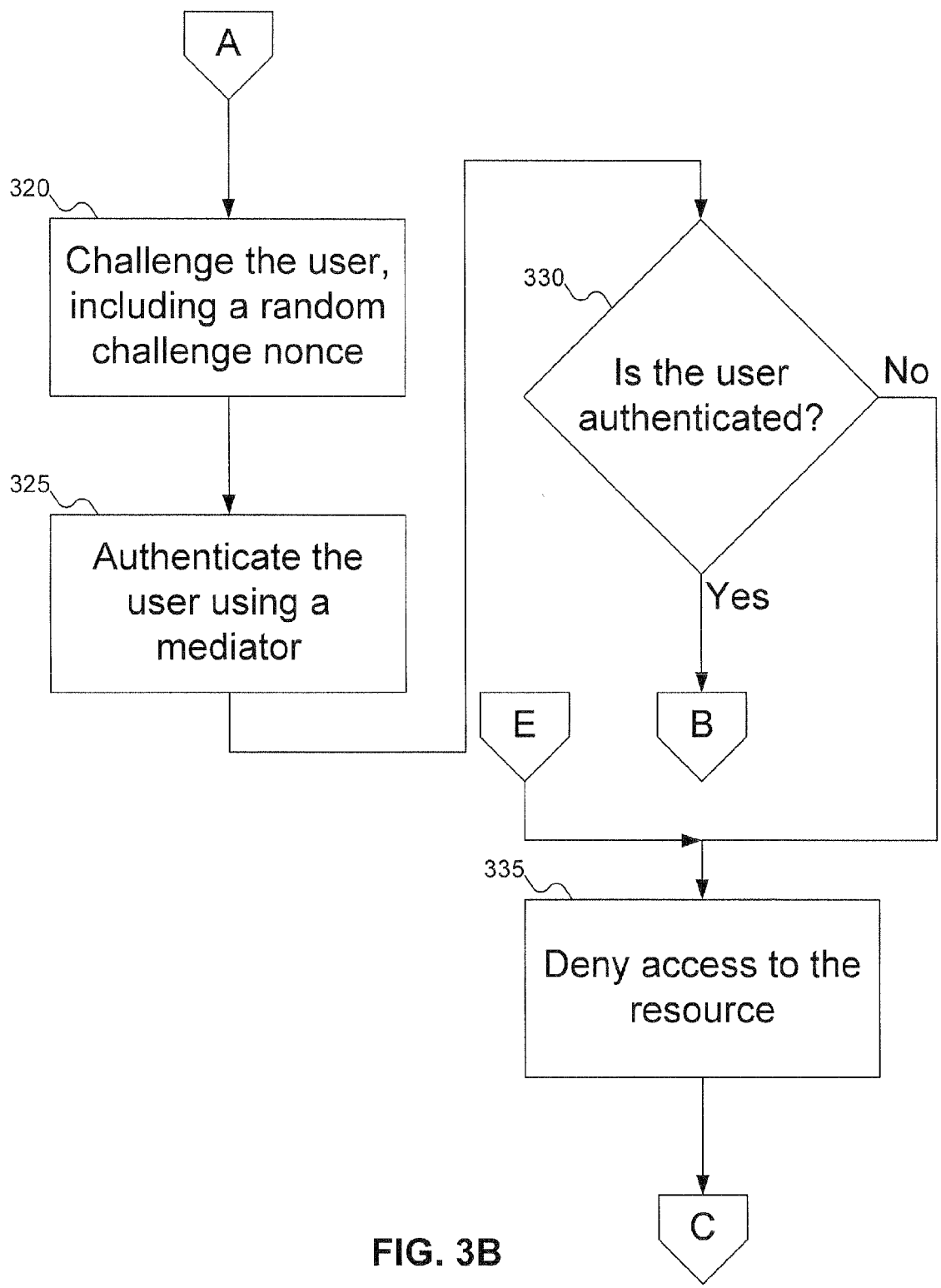
Figure 3C:
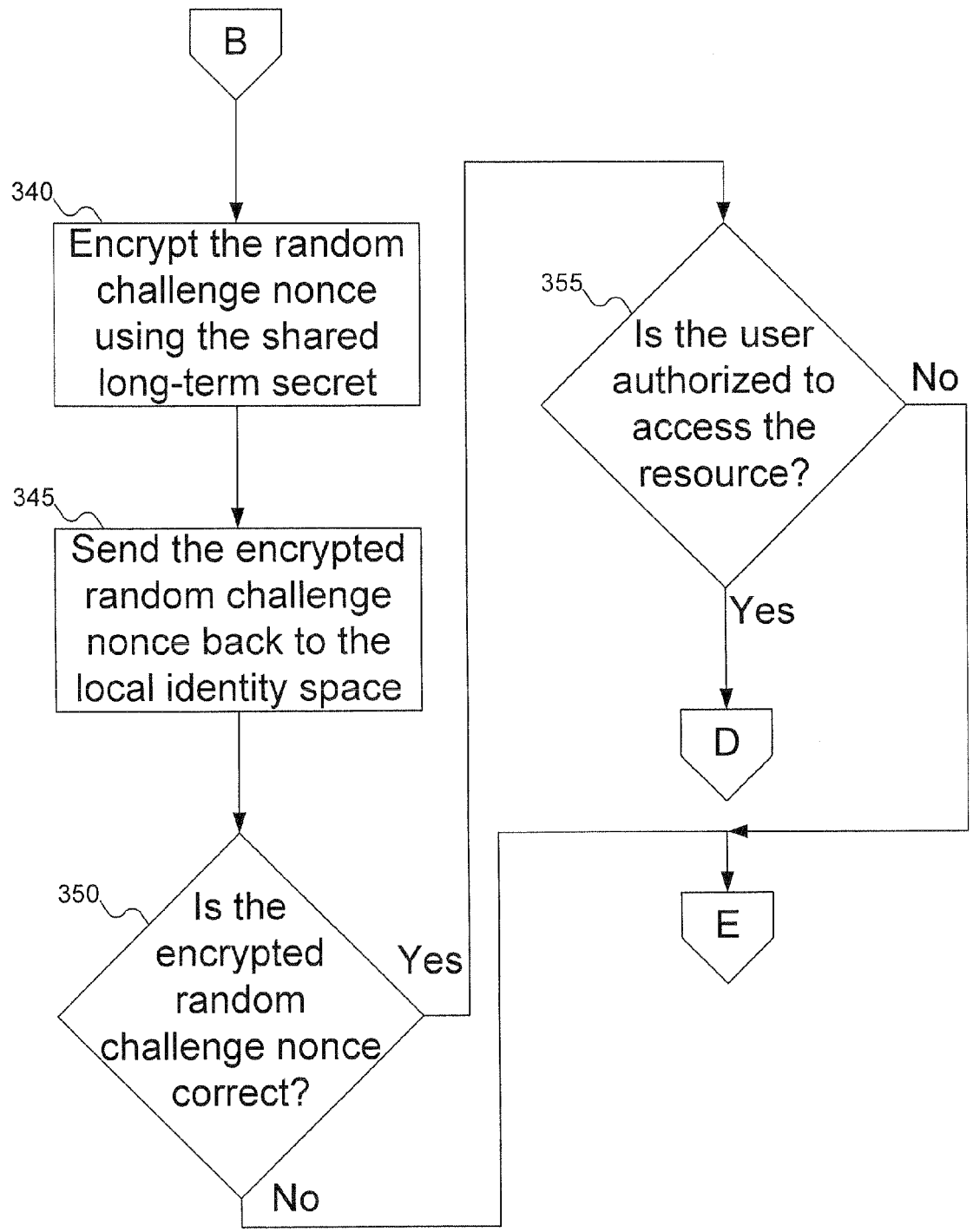
Figure 5A:
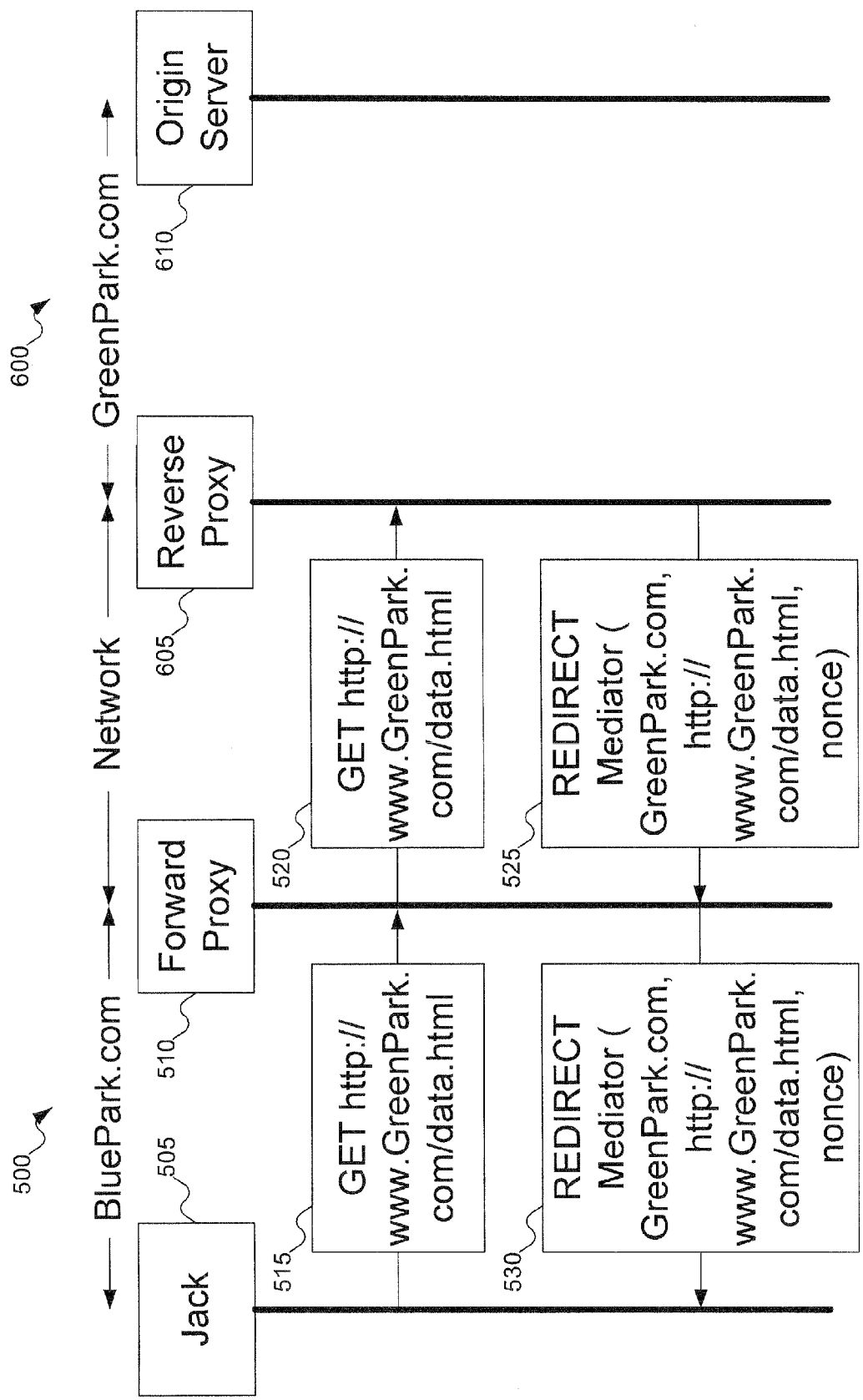
FIGS. 5A-5E show the messages in the protocol of a method according to the preferred embodiment.
Figure 5B:
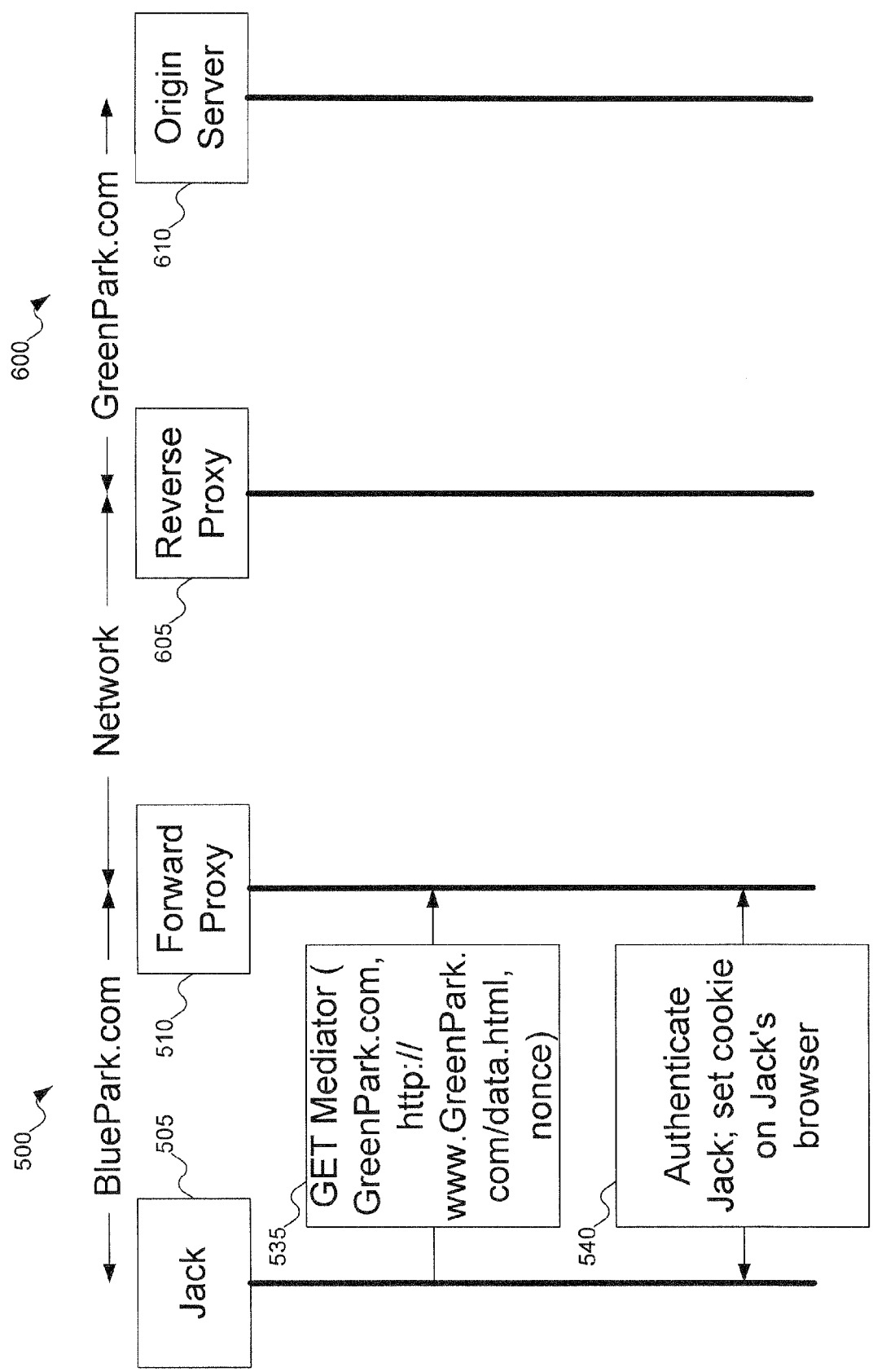
Figure 5C:
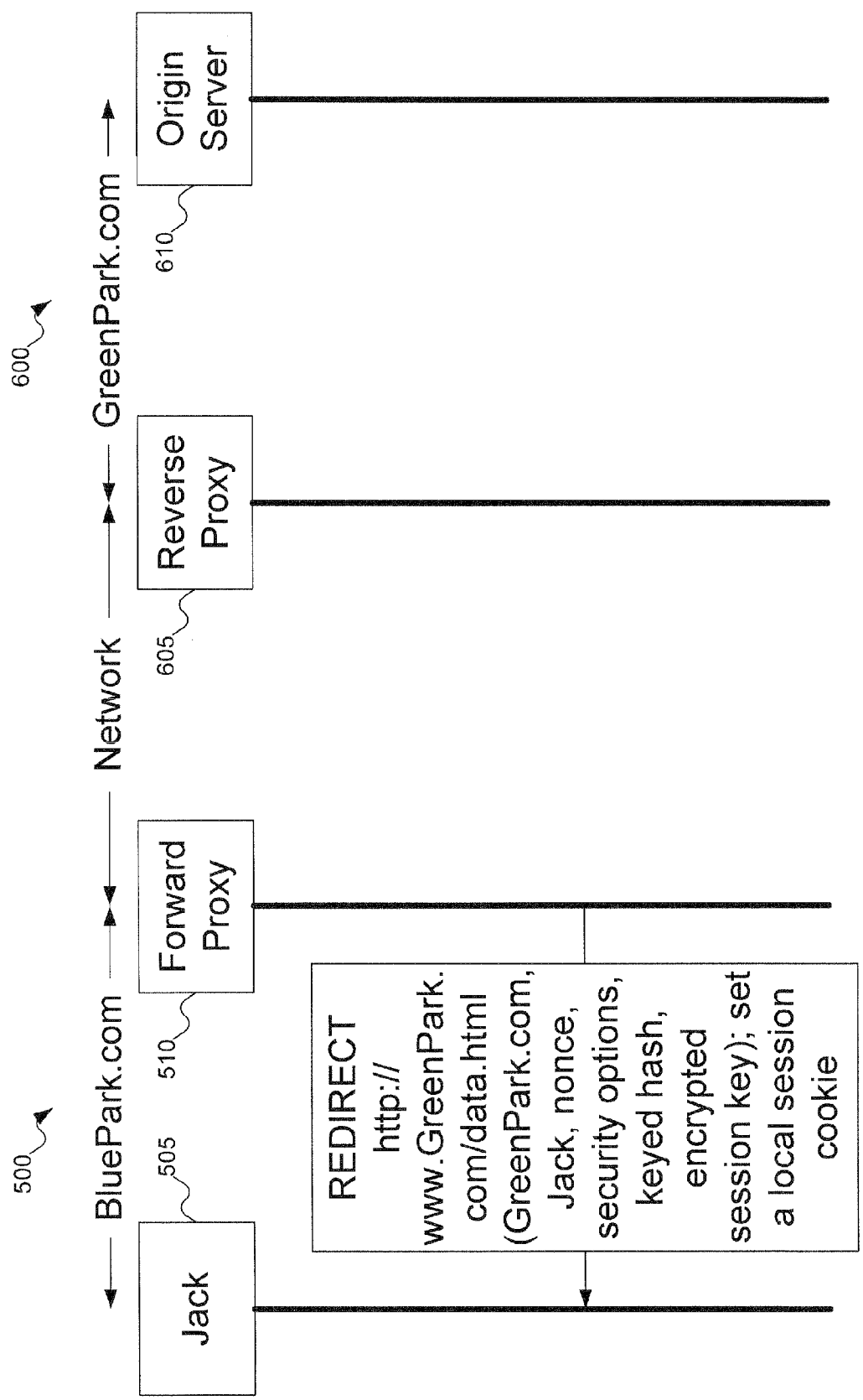
Figure 5D:
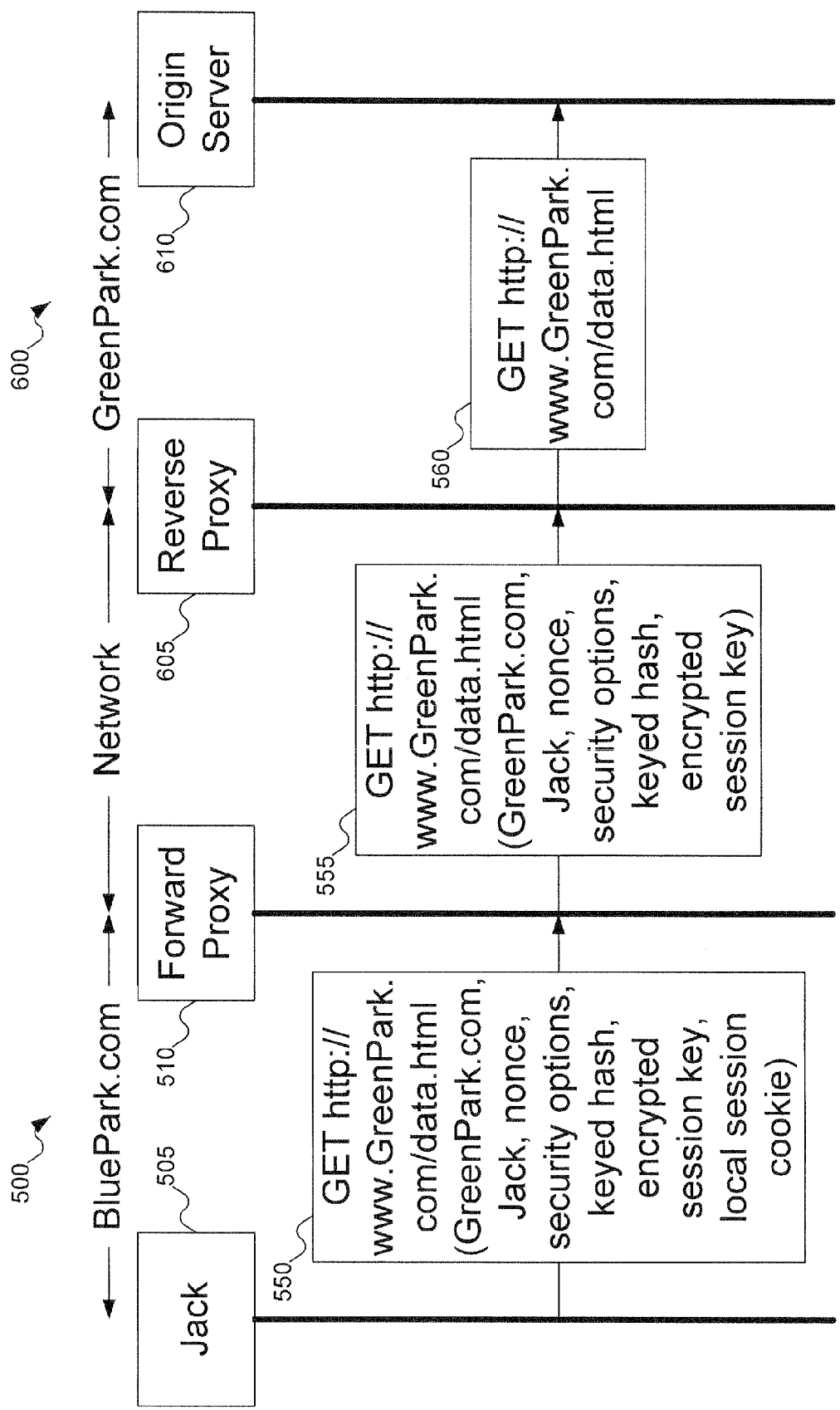
Figure 5E:
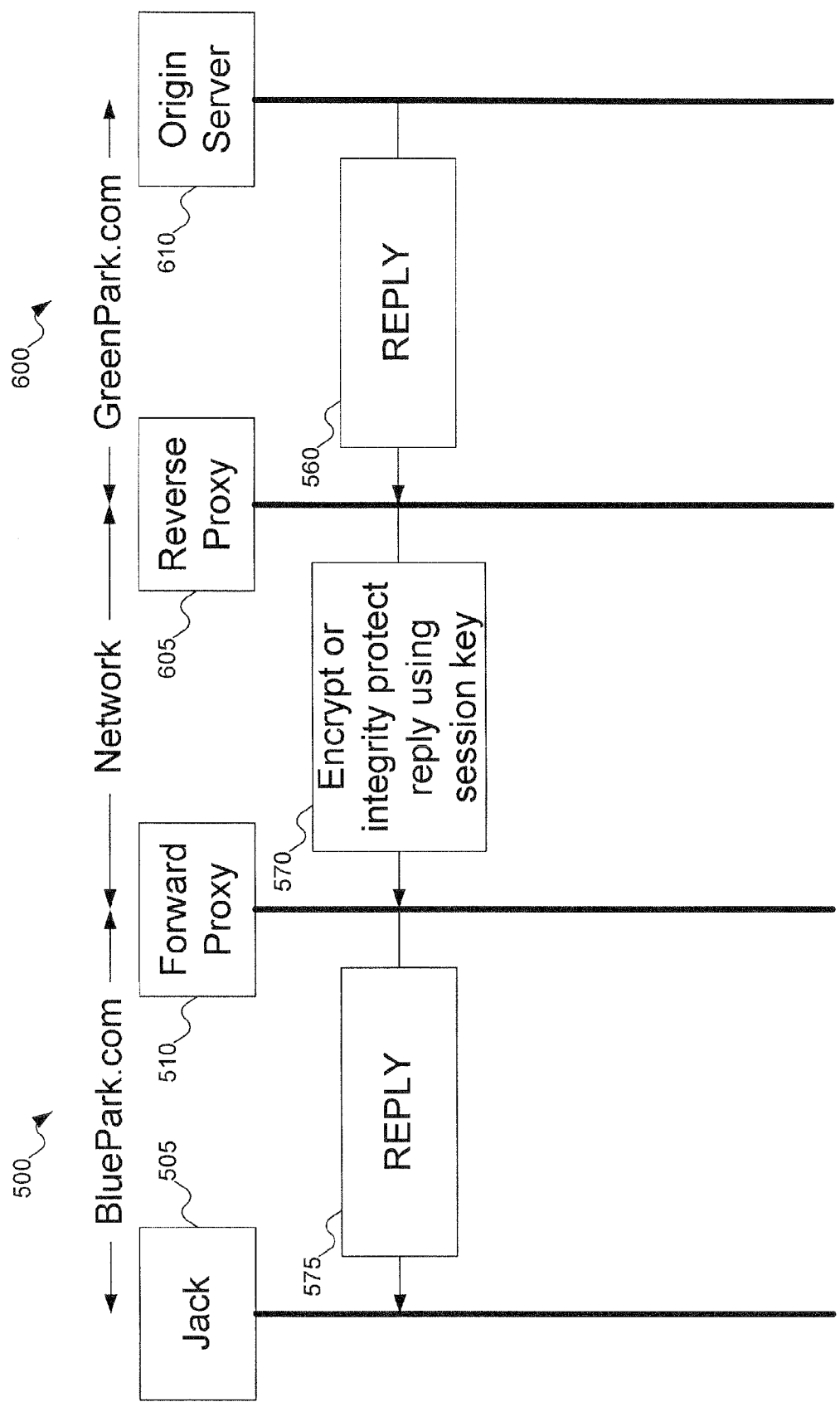

FIGS. 3A-3C show a flowchart of a method according to the preferred embodiment of the invention to access a resource in the remote domain of FIG. 2. At step 305, a request for access to a local resource is received from a remote identity space. At step 310, the local identity space checks to see if the resource is protected. If the resource is freely available, then at step 315 access to the resource by the external user is permitted. Otherwise, at step 320, the local reverse proxy challenges the user to authenticate himself externally, using a random challenge nonce. At step 325, a mediator in the remote identity space is used to perform the authentication. At step 330, the mediator checks to see if the user properly authenticated himself. If the user did not properly authenticate himself, then at step 335 the user is denied access to the resource. (The user can be denied at this point by the mediator, or the user can be denied later by the local identity space, when the encrypted random challenge nonce is determined to be incorrect.) Otherwise, at step 340, the remote identity space encrypts the random challenge nonce using the shared long-term secret. At step 345, the encrypted random challenge nonce is sent to the local identity space, which independently calculates what the encrypted random challenge nonce should be. At step 350, the received encrypted random challenge nonce is compared with the expected result. If the encrypted random challenge nonce is correct, the local identity space checks to see if the user is authorized to access the resource. If the user is authorized to access the resource, access is granted. Otherwise, if the user is not authorized to access the resource, or if the encrypted random challenge nonce was wrong, the user is denied access to the resource.

FIGS. 5A-5E illustrate the above seven steps for cross domain authentication and access protocol according to the preferred embodiment of the invention. Identity spaces 500 and 600 are two identity spaces in a federation. Access request 515 originates from an end user 505 of identity space 500. Access request 515 is a normal HTTP access request to a URL belonging to identity space 600. The end user's browser 505 submits request 515 to forward proxy 510 belonging to local identity space 500. Forward proxy 510, as with any request from a local user, forwards request 515 as request 520 to remote reverse proxy 605 of identity space 600. Reverse proxy 605 consults its security module and federation access policy (not shown) to decide if the requested resource is a protected one. If not, the response is sent (not shown).

If the resource is a protected resource, reverse proxy 605 redirects the user to the mediator URL by sending HTTP redirect 525 to forward proxy 510 with the necessary challenge parameters needed for cross authentication (explained in step 2 above). Forward proxy 510, as usual, forwards the redirect 525 as redirect 530 to the user's browser. The browser now transparently sends request 535 (see FIG. 5B) as per the redirect to forward proxy 510. Forward proxy 510, on seeing the mediator URL name in the request, authenticates the user (authentication 540) the user if he is not already authenticated, and sets an authentication cookie on the user's browser. Forward proxy 510 then redirects the user's browser to the originally requested URL by sending HTTP redirect 545 (see FIG. 5C) with all necessary parameters (explained in step 4 above) needed to cross authenticate the user at reverse proxy 605. Forward proxy 510 also sets a local session cookie on the user's browser to prevent replay, as explained in step 7 above.

The user's browser transparently sends HTTP request 550 (see FIG. 5D) along with the local session cookie, corresponding to the redirect. Forward proxy 510 verifies and removes the cookie and forwards HTTP request 550 as HTTP request 555 to reverse proxy 605. Reverse proxy 605 authenticates the request by verifying it as explained in step 6 above. Upon successful verification, reverse proxy 605 forwards HTTP request 555 to origin server 610 as HTTP request 560, after stripping off the authentication parameters. Origin server 610 sends response 565 (see FIG. 5E) to reverse proxy 605. Reverse proxy 605 encrypts and/or integrity protects response 565 using the session key and sends response 570 to forward proxy 510. Forward proxy 510 decrypts and/or verifies the integrity of response 570 using the session key and sends response 575 to the user's browser.

Naming of Users in a Federation

A federation can contain heterogeneous identity spaces, each using its own intranet security infrastructure such as Kerberos, Novell Directory Structure (NDS), Unix, or Lightweight Directory Access Protocol (LDAP). The different security infrastructures differ in the format and encoding of the names of principals/identities. The names appear as subjects (access identities) in the federation access policy and in HTTP access requests to identify the requesting principal (as discussed above in the section entitled "Protocol Details of HTTP Access in a Federation"). In order to support different security infrastructures names are converted to a common format. This common format includes components to identify the identity space name (also called the identity space prefix of the name), the naming scheme or type, and the actual user name.

For example, an LDAP distinguished name within the GreenPark identity space in the common format is "Green-Park.Com:LDAPDN:CN=John,O=GreenPark,C=US." A Kerberos 5 name in the BluePark identity space in the common format is "BluePark.com:Kerb5:Jack@BluePark.com." And so on.

The use of internet domain names as the prefix to identify the identity space ensures that all names in any federated identity space are unique.

The common format described above is exemplary. A person skilled in the art will recognize that any other naming format can be used, provided that all identity spaces in a federation interpret the common format in the same way.

Federation Access Policy

Each identity space in a federation maintains a local federation access policy that is enforced by the reverse proxy. The federation access policy is used to specify rights authorization of local resources to any identity in the federated identity space. Authorization is specified in one of two forms: ACL entries and identity mapping.

ACL Entries

The federation access policy can specify the rights authorization for federated identity space in the form of ACL entries. Each ACL entry identifies the external identity, the resource, and the type of access granted to the resource by the external identity. ACL entries are independent of the local security infrastructure, which enables identity spaces using different security infrastructures (i.e., identity spaces using different formats and encodings, such as Kerberos, LDAP, etc.) to form a federation. For example, the GreenPark identity space can give HTTP GET access right to Jack@BluePark.com for the local web page http://www.GreenPark.com/data.html using the following ACL entry:

"BluePark.com:Kerb5:Jack@BluePark.com http://www.GreenPark.com/data.html GET."

The ACL entries of the Federation Access Policy of an identity space can be organized by grouping the entries together based on the domain (identity space) prefix of the subject access identity. This makes searching the federation access policy efficient.

Authorization using ACL entries allows more granularity compared to identity mapping (described below) but at the cost of management overhead and efficiency.

Identity Mapping

The federation access policy of a local identity space can specify the rights authorized for identities in the federated identity space by mapping them to local identities in the local space. An external identity is allowed to access resources in the local identity space using the local identity to which the external identity is mapped. Identity mapping is specified as mapping entries in the policy. The identity mapping entries are name pairs of which one component is the local identity and the other component is the mapped external identity. Whoever submits an authenticated access request under the mapped external identity is allowed to access if and only if the local identity has the rights. For example, the GreenPark identity space can give HTTP GET access right to Jack@BluePark.com for the local web page http://www.GreenPark.com/data.html by mapping Jack@BluePark.com as a Strategic Customer and using the following ACL entry to give the local role identity access rights to the resource: "GreenPark.com:Kerb5:Strategic Customer http://www.GreenPark.com/data.html GET." Like ACL entries, identity mappings are independent of the local security infrastructure, which enables identity spaces using different security infrastructures to form a federation.

An advantage of access control based on identity mapping over that based on ACL is the ease of specifying and managing federation access policy. The need to separately specify the rights granted to external identities for each resource is averted by mapping external identities to the appropriate local identities. A local domain can create representational role identities like Strategic Customer, Ordinary Customer, Channel Partner, Marketing Partner, and Public Customer, and pre-assign rights these local role identities. Authorization can then be specified by mapping the external identities to appropriate role identities based on the nature of business relationship.

FIG. 4 shows both an access control list and an identity map for GreenPark. In FIG. 4, access control list 405 includes entry 410. Entry 410 is an access control list entry. It specifies that identity space BluePark.com (415) includes a user Jack (420). Jack is granted permissions to resource http://www.GreenPark.com/data.html (425). Jack is permitted to perform an HTTP GET command (430) on the resource.

Instead of using access control list entry 410, access control list 405 can include entry 440, describing the permissions associated with a particular local identity. For example, entry 440 specifies that identity space GreenPark.com (445) includes a particular local identity called Strategic Customer (450). A Strategic Customer is granted permissions to resource http://www.GreenPark.com/data.html (455), and can perform an HTTP GET command (460) on the resource.

To use the identity mapping, identity mapping table 465 maps external identities to the local identities. For example, identity mapping entry 470 specifies that user Jack@BluePark.com (475) is to be treated as a Strategic Customer (480). Thus, when Jack from identity space BluePark.com tries to access the resource http://www.GreenPark.com/data.html, the GreenPark security module can map Jack to a Strategic Customer (identity mapping entry 470), and therefore Jack has permission to get the resource (entry 440).

Establishment of Federation Agreement

The federation agreement, which is the basis for cross domain authentication and secure access, is realized cryptographically in the form of a shared secret between the proxies of the federating identity spaces. There are several practical means to establish this secret between to identity spaces that want to form a federation. Some possibilities are: an out of band one time agreement, an agreement using secure socket layer (SSL) based on a public key certificate (PKC), and a mediated agreement based on trust in a third party on-line authentication services.

An out of band agreement is simple, and is suitable when two organizations want to form an independent federation without the help of a third party certification authority (CA) or another on-line authority. The administrators of the identity spaces get together to decide upon a shared secret, which is then configured into the proxies.

Agreeing upon a shared secret for federation is possible using SSL if the concerned organizations have public key certificates (PKCs) issued by CAs trusted by both organizations. The federation secret may be established once in a day, once in a week, once in a month or can be good forever.

Organizations register with trusted on-line authorities for facilitating single sign-on for their customers. Each registered organization shares a master secret key with the trusted on-line authority. Two such registered organizations can form a federation by agreeing upon a federation secret mediated by the trusted on-line authority.

Third Party Mediation

Two extensions can be used to address the situations in which the identity federation arrangements are difficult to setup or support. These extensions are: (1) using a third party service to achieve the required mediation in a flexible way; and (2) using an ad-hoc, finer-grained, and individually-provisioned access control scheme alongside the preferred embodiment of the invention.

In the preferred embodiment of the invention, the forward proxies serve as authentication and channel mediators. Each forward proxy authenticates users from within its own domain, sets up a secure channel with the reverse proxy in the foreign domain, and provides an unforgeable and robust token (authenticator) that validates the accesses from its own domain to the foreign domain. These three features provide a foundation for building a powerful, peer-to-peer identity federation service between domains.

In some cases however, the forward proxy function poses a problem. This problem arises most commonly in two situations:

a) Business-to-Consumer ("B2C") commerce, in which one party is a single individual or a family, while the other party is a relatively large institution.

b) Commerce in which one party does not have the size or structure to meet the trust requirements of another party. For example, one party may be a very sensitive institution (such as the Department of Defense) while the other may be much less sensitive (for example, a university or a supplier of dual-use commodities).

Requiring the creation or maintenance of a close trust relationship between the proxies of the two parties is a problem in such situations. It is also a problem from a deployment standpoint: the identity federation mechanism has to be supported in proxies of both peer organizations in order for them to carry out commerce.

It would be desirable to selectively migrate the forward proxy role of the mediator out of the domain in which it is supported. But migrating it back into the foreign domain does not work: the foreign domain would have to undertake the administrative costs and risks associated with identifying all of its users. Rather, it is more appropriate to place this forward proxy mediation role into a third party. The challenge is to provide this mediation service transparently.

Consider the interaction between a user, John@MomAndPop.com, and a web site, http://www.BigEnterprise.com. John needs to access resources that BigEnterprise wishes to make available to John, provided John is securely identified as a permitted party. BigEnterprise, however, does not wish to take on the responsibility or overhead of creating and maintaining a database of such users. Enter a third party, called IdBroker. IdBroker is big enough for BigEnterprise to establish a trust arrangement, and has the ability to identify users like John@MomAndPop.com to a variety of companies or institutions, such as BigEnterprise, with all the necessary security guarantees. In effect, IdBroker acts like a credit card company does: IdBroker is a third party that can broker trust between purchasers and sellers of goods. However, there are several differences between the hypothetical IdBroker and a trusted on-line authority as described above. IdBroker can represent any party that can meet the security and trust requirements of the parties that want to identify themselves partially and selectively to each other. Further, the service that IdBroker implements is itself available to any party that desires to be a brokering service provider. Additionally, the software that delivers the functions ascribed to IdBroker can be run at several publisher sites, allowing IdBroker to create a network of its own—i.e., it does not require a single controlling party in the way that trusted on-line authorities anticipate.

Consider how third party mediation would work, using the earlier example. A user, Jack from BluePark accesses a web site in GreenPark. The GreenPark reverse proxy notes that Jack is unidentified, and sends a pre-formatted web page, asking the user (Jack) to select from a list of third party authenticators. Assume that Jack selects as the mediator IdBroker. The GreenPark reverse proxy redirects the access to IdBroker. Since Jack selects IdBroker as the mediator and the GreenPark reverse proxy offers IdBroker as the mediator, IdBroker is trusted by both sides to serve as the mediator.

An alternative is that the BluePark DNS maps a well-known domain name such as the mediator used in the peer-to-peer scheme of earlier sections to the pre-selected third party authenticator such as IdBroker. In this case, IdBroker.com is perhaps a well known authentication services provider, trusted by a large community of web sites—much as major credit card issuers are trusted by a large number of merchants.

IdBroker authenticates the user and informs the GreenPark reverse proxy of the identity mapping that it has performed. (Note that IdBroker already has a pre-established trust relationship with GreenPark, and therefore can federate the identity of external users by mapping them to pre-assigned identities within GreenPark.) As part of authenticating Jack, IdBroker has a pre-established secure channel with Jack.

The next step is to emulate the function of the forward proxy with respect to steps 5, 6, and 7 of the section entitled "Protocol Details of HTTP Access in a Federation" above, at machines other than the forward proxy. This emulation is important, because it provides the encryption between the individual and the enterprise. There are three alternative means for doing this, each with different advantages and disadvantages.

First, the GreenPark reverse proxy can emulate the role of the forward proxy. IdBroker redirects Jack using SSL to GreenPark, but to a special port. This special port emulates the forward proxy functions that were performed by the BluePark forward proxy for Jack as described earlier. The advantage of this scheme is that it requires no modifications at other machines except at the reverse proxy, and as the GreenPark reverse proxy already needs to be modified in order to support steps 5, 6, and 7 anyway, it becomes the convenient single point for implementing the protocol. The disadvantage, however, is the SSL overhead that the browser must face in conversation with the GreenPark reverse proxy. The second alternative addresses this drawback.

Second, IdBroker can emulate the role of the forward proxy. In comparison to the first alternative, the forward proxy emulation for steps 5, 6, and 7 is transferred to IdBroker (at a special port). Again, the browser converses with IdBroker through an SSL channel, but the overhead of setting up the channel itself is absorbed in the SSL channel set up for authenticating the browser in previous steps. Against this advantage, however, either the GreenPark reverse proxy has to redirect each access from Jack back to IdBroker, where it can then be locally redirected to the forward proxy emulator, or the HTML pages that are sent back to Jack from the GreenPark reverse proxy need to be renamed from HTTP URL references as GreenPark resources to HTTPS URL references as aliases at IdBroker. For example, suppose the first page that Jack@BluePark.com requests from GreenPark is P0. Now, before sending P0 to Jack, IdBroker takes any URL imbedded within P0, such as http://www.GreenPark.com/bp1/bp2.html, and converts it to https://www.IdBroker.com:1947/?token=GreenPark-com-$bp1-$bp2.html. This allows IdBroker to receive and map the object requested by the URL to the original object URL before the HTML rewrite. (The port number 1947 is just an arbitrary example of the special port that can re-map the access.) The third alternative avoids this awkward HTML rewriting.

Third, a programmable browser extension can emulate the role of the forward proxy. In this alternative, a proxy program is downloaded and run on the same machine as user's browser. This program transforms the user's HTTP messages transparently. Using this proxy program, IdBroker authenticates Jack using SSL, sends a private session key to Jack using the same SSL session, and sends Jack the redirect of step 5 over SSL. The proxy program on Jack's machine now uses the session key to interact with GreenPark. A special port on GreenPark runs the corresponding instructions to receive the same session key from IdBroker and to use it to decrypt the messages sent from the browser-proxy. An example of such a browser side proxy the AT&T iPROXY (information available at http://www.research.att.com/sw/tools/iproxy/) is already available. Indeed, IdBroker itself can distribute such a proxy online over the initial SSL session as an applet or using other means.

Another extension to the ideas proposed earlier allows for the creation of ad-hoc, finer grained access control mechanisms. For the purpose of this discussion, the focus will be on the security module in the proxy.

Assume that the security module provides, in addition to what was discussed earlier, a facility by which object granular access control rules can be stored and applied. Consider anew the example where a user, Jack from BluePark wants to access a file on a server in GreenPark. Suppose that BluePark and GreenPark have no existing trust relationship, nor is there an external mediator through which Jack's identity can be mapped to something that is valid in the GreenPark domain. This is not an uncommon situation today: an organization's servers host a lot of objects, many of which could be shared with external individuals who are well known to people within the organization. Thus, in our example, Jack from BluePark may be well known to John in GreenPark, and John may wish to formulate a rule through which Jack can be given controlled and audited access to resources in GreenPark, without requiring a formal mechanism and arrangement between BluePark and GreenPark domains.

Ahead of time, John obtains Jack's public key certificate and creates an access control ticket. In this access control ticket, John encodes a rule that the individual whose public key certificate matches the given certificate should be allowed the desired type of access to the named resources. John then loads this rule into the security module of the GreenPark reverse proxy. John can load the rule into the security module without needing any assistance from the GreenPark system administrator. The GreenPark reverse proxy also includes a "background authentication" function, whereby external users that access GreenPark resources but specify no federated or third party mediation are automatically routed to the GreenPark security module. Now, whenever Jack accesses GreenPark and the GreenPark reverse proxy determines that Jack does not have a mediator (assume that one of the third-party mediators available is the security module of the GreenPark reverse proxy), the GreenPark reverse proxy proceeds to perform an mutual-authentication SSL handshake with Jack. In this process, it obtains Jack's certificate, and queries itself to determine whether any access control rules applying to Jack are available. It retrieves the appropriate rules, and enforces them. (Novell's current product, DigitalMe™, can be easily modified to support this extension.)

Both extensions described in this section can be viewed as special cases of a unified scheme for federating identity and access control decisions, which include the scheme described in the foregoing sections. This unification is achieved by recognizing that third-party authentication and background authentication of the accessing user's identity are authentication methods that are offered as choices additional to the scheme of forward-proxy based authentication described earlier. Thus, the combination of the scheme described earlier in this paper and the two extensions described above in this section provides a powerful and flexible foundation for dissolving the organizational and efficiency barriers to cross-domain access control, without altering the security guarantees that need to be in place.

Business Value

An infrastructure that allows a federation of two or more domains representing identity spaces to form a federated identity space can easily facilitate cross domain authentication without any additional overhead and risks of extra identity creation. The components of that infrastructure are the brokers who mediate cross domain authentication. Each participating domain is represented by a broker maintained by the domain and all outgoing and incoming authentication requests to the domain identity space are mediated through the broker. HTTP being the dominant protocol for information access, the ideal choice of who to be the domain broker is the application proxy (HTTP proxy) on the organizational firewall, which already acts as the mediator for HTTP access. Introducing the role of forward and reverse proxies in a domain to include identity brokering adds significant value to these proxies, and enables businesses to rapidly and cheaply erect a federated identity space infrastructure for use in Business-to-Business ("B2B") commerce.

Furthermore, as described above, a mediator can be used in place of a forward proxy. The use of a mediator makes it easy to achieve the brokering of identity between organizations without requiring both organizations to field forward proxies through which internal accesses flow. A further benefit of third party mediation is that it allows finer grained, ad-hoc access control schemes so that each individual can "tag" the objects that he/she controls, in order to specify the type of access control that can be enforced on these objects when accessed by those outside the organization's identity space.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. An apparatus in a computer system, comprising:
   a reverse proxy;
   a security module accessible from the reverse proxy; and
   at least one access control rule loaded in the security module, the access control rule identifying a resource and a user,
   where the security module is designed to permit loading the access control rule without involving an administrator and to use the access control rule if said user is not a member of a domain including the reverse proxy.

2. An apparatus according to claim 1, wherein the access control rule further identifies a type of access to said resource by said user.

3. An apparatus according to claim 2, wherein said type of access is a subset of a type of access granted to a second user responsible for the creation of the access control rule.

4. An apparatus according to claim 1, wherein the access control rule includes a public certificate used to identify said user.

5. An apparatus according to claim 4, wherein the security module is operative to receive said public certificate from a machine operated by said user.

6. An apparatus according to claim 5, wherein the security module is operative to permit said user access to said resource if said public certificate received from said machine operated by said user matches said public certificate in the access control rule.

7. An apparatus according to claim 1, wherein the reverse proxy is operative to route a request for access to said resource to the security module if an authentication of said user cannot be mediated or determined using a federation access policy.

8. An apparatus according to claim 1, wherein the security module is operative to deny said user access to said resource if said user is not properly identified.

9. A method implemented in a computer system in a first domain, comprising:
   receiving a request to access a resource by a user where the user is in a second domain;
   accessing at least one access control rule in the first domain including the resource, the access control rule identifying the resource and the user, the first domain distinct from the second domain;
   determining an identity of the user;
   comparing the identity of the user with the access control rule; and
   granting the user access to the resource if the identity of the user matches the user identified in the access control rule.

10. A method according to claim 9, wherein granting the user access to the resource includes:
    determining a type of access from the access control rule; and
    granting the user access to the resource limited by the type of access.

11. A method according to claim 9, wherein:
    accessing at least one access control rule identifying the resource and the user includes accessing at least one access control rule identifying the resource and the user, the access control rule including a public certificate of the user; and
    determining an identity of the user includes accessing a public certificate of the user from a machine operated by the user.

12. A method according to claim 9, further comprising determining that the user cannot be authenticated by a mediator or a federation access policy.

13. A method according to claim 9, further comprising denying the user access to said resource if the user is not properly identified.

14. A method according to claim 9, further comprising receiving the access control rule from a second user in the first domain without involving an administrator.

15. A method according to claim 14, wherein receiving the access control rule from a second user includes receiving the access control rule from a second user in the first domain, the access control rule including a type of access to the resource, the type of access a subset of a second type of access to the resource granted to the second user.

* * * * *